(12) United States Patent

Dowle et al.

(10) Patent No.: US 12,558,946 B2

(45) Date of Patent: Feb. 24, 2026

(54) TONNEAU SYSTEM WITH FLEXIBLE COVER

(71) Applicant: Rivian IP Holdings, LLC, Plymouth, MI (US)

(72) Inventors: James John Alexander Dowle, Laguna Beach, CA (US); Philipp Josef Wolf, Dana Point, CA (US); Greg Witten, Oxfordshire (GB); Andrew Frierott, Northville, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 230 days.

(21) Appl. No.: 18/131,292

(22) Filed: Apr. 5, 2023

(65) Prior Publication Data

US 2024/0208306 A1 Jun. 27, 2024

Related U.S. Application Data

(60) Provisional application No. 63/435,174, filed on Dec. 23, 2022.

(51) Int. Cl.
| | |
|---|---|
| *B60J 7/12* | (2006.01) |
| *B60J 7/06* | (2006.01) |
| *B60J 7/10* | (2006.01) |

(52) U.S. Cl.
CPC .................. *B60J 7/12* (2013.01); *B60J 7/102* (2013.01); *B60J 7/068* (2013.01)

(58) Field of Classification Search
CPC ..... B60J 7/06; B60J 7/062; B60J 7/067; B60J 7/068; B60J 7/12; B60J 7/10; B60J 7/102; B60J 7/085; B60J 7/185; B60J 7/1858; B60P 7/04

USPC ........... 296/100.11, 100.12, 100.15, 100.16, 296/100.18
See application file for complete search history.

(56) References Cited

U.S. PATENT DOCUMENTS

| | | | | |
|---|---|---|---|---|
| 6,234,561 | B1 * | 5/2001 | Huotari | B60J 7/102 |
| | | | | 296/100.15 |
| 6,257,647 | B1 * | 7/2001 | Ninness | B60J 7/102 |
| | | | | 296/100.18 |
| 8,146,981 | B2 * | 4/2012 | Huotari | B60J 7/068 |
| | | | | 296/100.18 |
| 9,969,249 | B2 * | 5/2018 | Spencer | B60J 7/085 |
| 11,084,361 | B2 * | 8/2021 | Dylewski, II | B60R 5/047 |
| 11,535,092 | B2 * | 12/2022 | Zheng | B60J 7/12 |
| 2013/0033061 | A1 * | 2/2013 | Yue | B60J 7/10 |
| | | | | 296/100.18 |
| 2018/0134132 | A1 * | 5/2018 | Nania | B60P 7/04 |

* cited by examiner

*Primary Examiner* — Amy R Weisberg
*Assistant Examiner* — Denise Lynne Esquivel
(74) *Attorney, Agent, or Firm* — HG LAW LLP

(57) ABSTRACT

Particular embodiments may provide a tonneau system for a vehicle. The tonneau system may be movable between an extended configuration and a retracted configuration. The tonneau system may include a cover, a beam, and rails. The cover may have two side edges and a tail edge, the beam may be coupled to the tail edge of the cover, and the rails may be coupled to the side edges of the cover. In some embodiments, the beam and the rails bi-directionally tension the cover when the tonneau system is in the extended configuration.

20 Claims, 17 Drawing Sheets

Provide a tonneau system, the system including a
retracted configuration and an extended configuration

1320

Bi-directionally tension a cover of the tonneau system

TONNEAU SYSTEM WITH FLEXIBLE COVER

CROSS REFERENCE TO RELATED APPLICATION

This application claims the benefit of priority under 35 U.S.C. § 119 to U.S. Provisional Application No. 63/435,174 filed Dec. 23, 2022, the entire contents of which is incorporated by reference herein.

INTRODUCTION

Tonneau systems are frequently used to protect cargo in truck beds. In some instances, tonneau systems include a flexible cover that can be rolled or otherwise compressed for improved access to a cargo volume.

BRIEF SUMMARY

Traditionally, tonneau systems with flexible covers may provide incomplete or insufficient seals. In some instances, flexible covers must be first tensioned fore to aft, then separately tensioned side-to-side (for example, using Velcro or other adhesion methods to retain side-to-side tension). Disclosed herein are tonneau systems that bi-directionally tension a cover. In some embodiments, a tonneau system for a vehicle is movable between an extended configuration and a retracted configuration. The system can include a cover, with two side edges and a tail edge, and a beam coupled to the tail edge of the cover. Rails may be coupled to the side edges of the cover, where the beam and the rails bi-directionally tension the cover when the tonneau system is in the extended configuration.

In some embodiments, a vehicle tonneau system may be movable between an extended configuration and a retracted configuration. The tonneau system may include a cover, a beam, and rails. The cover may have two side edges and a tail edge, the beam may be coupled to the tail edge of the cover, and the rails may be coupled to the side edges of the cover. In some embodiments, the beam and the rails bi-directionally tension the cover when the tonneau system is in the extended configuration.

The beam and rails may, in some embodiments, bi-directionally tension the cover by tensioning in a direction parallel to the side edges and in a direction parallel to the tail edge. In some further embodiments, the beam and rails may bi-directionally tension the cover by first tensioning the cover in the direction parallel to the side edges and then simultaneously further tensioning the cover in the direction parallel to the side edges and tensioning the cover in the direction parallel to the tail edge.

In some embodiments, the cover includes a lip along at least one of the side edges and a rail of the rails interacts with the lip to tension the cover in a direction parallel to the tail edge. In yet further embodiments, the system includes a cam coupled to the beam such that turning the cam turns the rails, thereby moving the lip away from a center of the cover.

A rod may, in some embodiments, be coupled to the beam such that pulling the rod moves the beam and rotating the rod rotates the beam. In some further, embodiments, the rod fits within the beam.

Some embodiments of the system include a rod coupled to the beam such that pulling the rod moves the beam in a direction parallel to the side edges, and rotating the rod relative to the beam causes the rails to tension the cover. In some further embodiments, a linking element connects the rod to a rail of the rails, and rotating the rod relative to the beam causes the linking element to move toward the rail to tension the cover. In yet further embodiments of the system, a second linking element is coupled to the rod and connects the rod to a second rail of the rails, and rotating the rod relative to the beam causes the second linking element to move toward the second rail of the rails to tension the cover. In some embodiments, the rod and beams couple at a point between a point where the rod and first linking element couple and a point where the rod and second linking element couple.

The system, in some embodiments, include ribs to support the cover, ribs positioned under the cover and in a direction parallel to the tail edge. In some embodiments, a rail of the rails includes a track and the system includes slugs attached to the ribs and configured to sit in the track. In some further embodiments, a rib extends through a slug of the slugs and through the track. In some embodiment, the lateral distance between a cargo volume side wall and proximal end of the rib is controlled and thereby the lateral tensions of the cover. In yet further embodiments, the track includes an opening proximal the cover, wherein the opening is shaped to control the bow of the rib across the cargo volume.

In some embodiments, a rib supports the system's cover. A force acts on the rib when the beam and the rails bi-directionally tension the cover, the force causing the rib to bow.

In some embodiments of the system, a rail of the rails includes a track, and the system includes slugs attached to the cover and configured to sit in the track. In some further embodiments, the system includes a feed ramp to guide the slugs from the retracted configuration into the track. In some embodiments, the slugs include an angular leading edge.

A motor may move the system between the extended configuration and the retracted configuration, in some embodiments. In embodiments with a motor, the motor may cause the beam and rails to bi-directionally tension the cover.

In some embodiments, the cover overlaps, in the extended configuration, an area corresponding to an open cargo volume of the vehicle. Further, in the extended configuration, the cover may seal the cargo volume of the vehicle. In the retracted configuration, the cover may overlap an area less than an area overlapped in the extended configuration.

The system may include, in some embodiments, a user interface for controlling movement of the tonneau system between the extended configuration and the retracted configuration.

Some embodiments of the system include a gasket positioned between the cover and a side wall of a cargo volume.

The beam, in some embodiments of the system, is coupled to a plunger and the plunger contacts the rail. In some embodiments, the beam is angled at an end proximal to the rail. In some embodiments, the beam is angled at an end proximal to the rail and the beam is coupled to a plunger and the plunger contacts the rail.

In some embodiments, the beam of the system includes a straight middle portion and angled end portions, the end portions proximal to the rail. In some further embodiments, the beam is coupled to a plunger at an end portion and the plunger contacts the rail.

Some embodiments include a method of closing a tonneau system that includes a cover. The method may include moving the tonneau system from a retracted configuration to an extended configuration, wherein moving the tonneau system to the extended configuration comprises bi-directionally tensioning the cover in the extended configuration.

In some embodiments of the method, the tonneau system includes a beam and rails and the cover includes two side edges and a tail edge, where the beam is coupled to the tail edge of the cover and the rails are coupled to the side edges of the cover. In such embodiments, bi-directionally tensioning the cover may include the beam and the rails cooperating to bi-directionally tension the cover. In further embodiments, the beam and the rails cooperate to bi-directionally tension the cover by tensioning the cover in a direction parallel to the side edges and in a direction parallel to the tail edge. In yet further embodiments, the beam and rails cooperate to bi-directionally tension the cover by first tensioning the cover in the direction parallel to the side edges and then simultaneously further tensioning the cover in the direction parallel to the side edges and tensioning the cover in the direction parallel to the tail edge. In some embodiments of the method, the tonneau system includes a rod coupled to the beam and the method further includes. pulling the rod to move the beam in a direction parallel to the side edges. In further embodiments, rotating the rod relative to the beam causes the rails to tension the cover.

Some embodiments include a vehicle having a cargo area and a tonneau system. The system may include an extended configuration that overlaps the cargo area and a retracted configuration that overlaps less of the cargo area than the extended configuration. The tonneau system may include a cover, a beam, and rails. In some embodiments, the cover includes two side edges and a tail edge, the beam is coupled to the tail edge of the cover, and the rails are coupled to the side edges of the cover. The beam and the rails may bi-directionally tension the cover when the tonneau system is in the extended configuration.

In some embodiments, the vehicle includes walls adjacent to the cargo volume associated with the cargo area. In such embodiments, the rails may be coupled to the walls. In some embodiments, a trim of the vehicle overhangs a point of interaction between the cover and a side wall of the cargo volume.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

4

DETAILED DESCRIPTION

Disclosed herein are tonneau systems that bi-directionally tension a cover. In some embodiments, a tonneau system for a vehicle is movable between an extended configuration and a retracted configuration. The system can include a cover, with two side edges and a tail edge, and a beam coupled to the tail edge of the cover. Rails may be coupled to the side edges of the cover, where the beam and the rails bi-directionally tension the cover when the tonneau system is in the extended configuration.

Figures 1A, 1B:
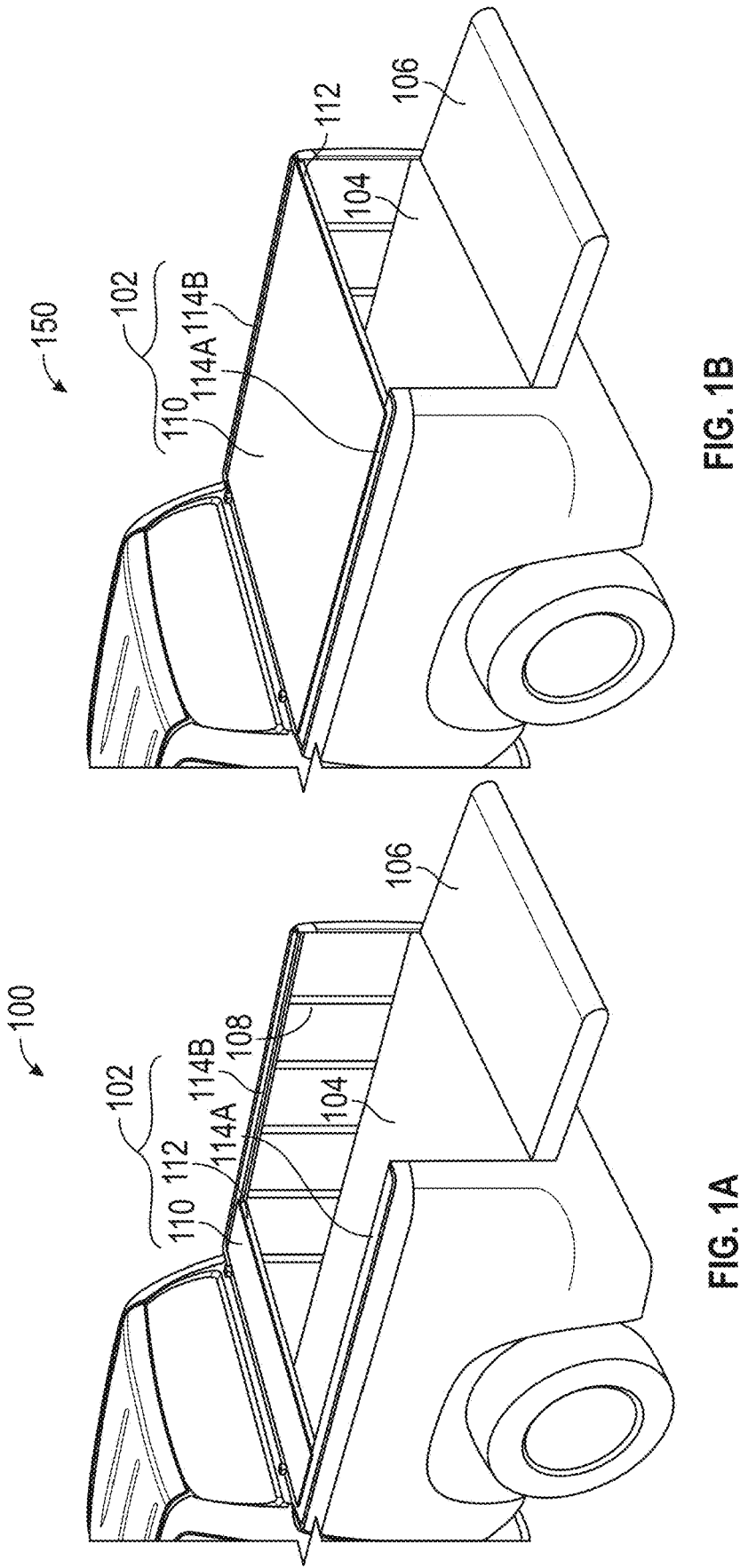
FIG. 1A illustrates a vehicle with an example tonneau system in a retracted configuration.
FIG. 1B illustrates the vehicle with the tonneau system in an extended configuration.

FIG. 1A illustrates a vehicle with an example tonneau system 102 in a retracted configuration 100. The tonneau system 102 includes a cover 110, a beam 112, and rails 114A and 114B. The vehicle includes a cargo volume bounded by the truck bed 104, the vehicle's cab, a tail gate 106, and cargo side walls 108. Although the cargo volume in FIG. 1A is depicted as the volume of a truck bed, it will be appreciated that this disclosure is not limited to truck bed volumes.

Tonneau system 102 is movable between the retracted configuration 100, shown in FIG. 1A, and an extended configuration 150, shown in FIG. 1B. In the extended configuration 150 illustrated in FIG. 1B, cover 110 overlaps an area corresponding to an open cargo volume of the vehicle. As used herein, a cover overlaps an area corresponding to an open cargo volume when the cover occupies an area that would occlude an open portion of the cargo volume. In some embodiments, the cover alone occludes the area. In other embodiments, the cover combined with rails, beams, and/or other components occlude the area. In the tonneau system's retracted configuration 100, the cover overlaps a smaller area than in the extended configuration 150. Overlapping a smaller area allows access to an open cargo volume, such as the cargo volume associated with truck bed 104. Although FIG. 1B shows tonneau system 102 in a specific retracted position, it should be appreciated that tonneau system 102 can be placed in various retracted configurations (for example, retracted configurations 200 and 300 described below with respect to FIGS. 2 and 3).

Advantageously, tonneau system 102 can be sealed at all four sides of cover 110. For example, cover 110 can be sealed at the truck's cab and at tail gate 106, such as is known in the art. Cover 110 can also be bi-directionally tensioned in a direction from the cab to the tail gate of the truck bed and also in a direction from side wall to side wall of the truck bed (see description below with respect to FIGS. 4-7). The side-to-side tensioning of cover 110 can include sealing cover 110 along the side edges of the cover, thereby sealing the cover on all four sides.

Figures 2, 3:
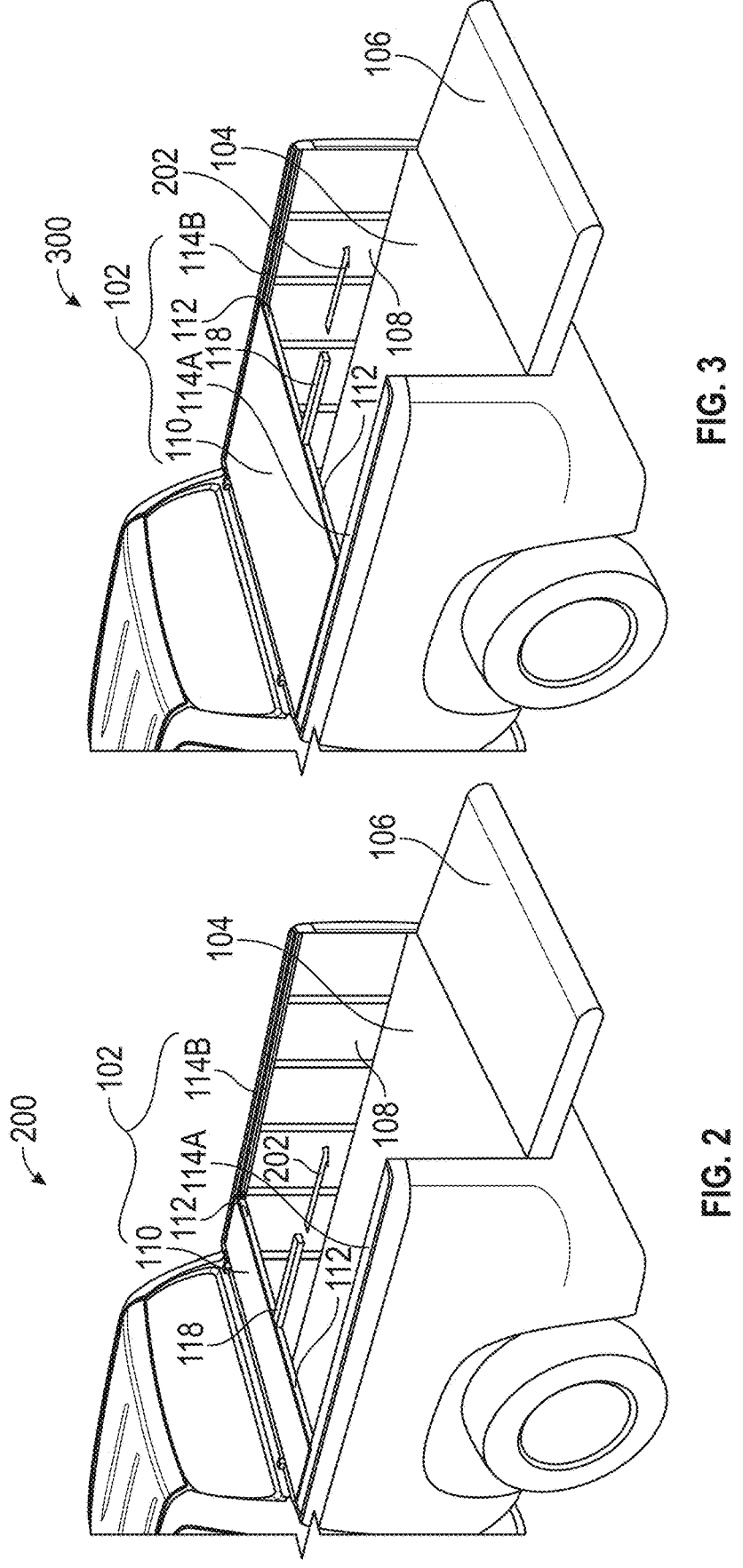
FIG. 2 illustrates a vehicle with a tonneau system in a retracted configuration, in accordance with an embodiment.
FIG. 3 illustrates a vehicle with a tonneau system in a retracted configuration, in accordance with an embodiment.

With reference to FIGS. 2-7, an exemplary method of bi-directionally tensioning cover 110 will now be described. In FIG. 2, cover 110 is in a retracted configuration 200, similar to the retracted configuration of FIG. 1A. In some embodiments of the retracted configuration, the cover may be gathered or compressed (e.g., rolled up or folded) and stored (such storage may be in the truck body or in a dedicated housing). In the retracted configuration, an open cargo volume of the vehicle is not occluded by the cover. The cover includes two side edges and a tail edge. As used herein, the cover's tail edge can be understood to be the leading edge of the cover when the cover is moved from the retracted configuration to the extended configuration, and the cover's side edges can be understood to be edges of the cover that are at angle (e.g., a 90 degree angle) to the tail edge and along a side wall of the cargo volume.

The tail edge of cover 110 includes beam 112. Beam 112 may be attached to, or incorporated into, cover 110 through any suitable mechanism, including via fasteners, ties, clamps, holds, adhesives, or a combination thereof. Beam 112 extends along the tail edge of the cover from one side edge to the other. The beam may be rigid, non-rigid, or have both rigid and non-rigid portions. The beam may be constructed of any suitable material, such as plastic, metal, wood, or a combination thereof. The beam may be sized to fit the dimensions of the associated cargo volume; for the truck beds disclosed herein, the beam may be approximately 50 inches in light and 2 inches in diameter. The side edges of cover 110 are attached to rails 114A and 114B (exemplary attachments of the rails and cover are described further below). Rails 114A and 114B are, in turn, attached to side walls 108 of the cargo volume. Side wall-rail attachment may be via screws, bolts, other fasteners, welding, adhesive, or any other suitable mechanism.

Cover 110 can be any material that is sufficiently flexible to be rolled (or otherwise gathered, folded, or compressed) in the retracted configuration and bi-directionally tensioned in the extended configuration. Cloth or other flexible material, such as those used in roofs of convertible vehicles, is used in some embodiments. The cover is, in some embodiments, vinyl, canvas, polyester fabric, Kevlar®, other weather-resistant fabric, or any combination thereof.

FIG. 3 depicts tonneau system 102 in another retracted configuration, where cover 110 is pulled in direction 202 to move cover 110 from the retracted configuration toward an extended configuration, as described further below. To assist movement between the retracted configuration and the extended configuration, rod 118 is coupled to beam 112. As described further below, rod 118 may, in addition to moving beam 112 (and hence moving cover 110) between the retracted and extended configuration, rotate beam 112. As also discussed further herein (see, e.g., FIG. 6), rod 118 may, in some embodiments, fit inside beam 112. The rod may be rigid, non-rigid, or have both rigid and non-rigid portions. The rod may be constructed of any suitable material, such as plastic, metal, wood, or a combination thereof.

Figure 4:
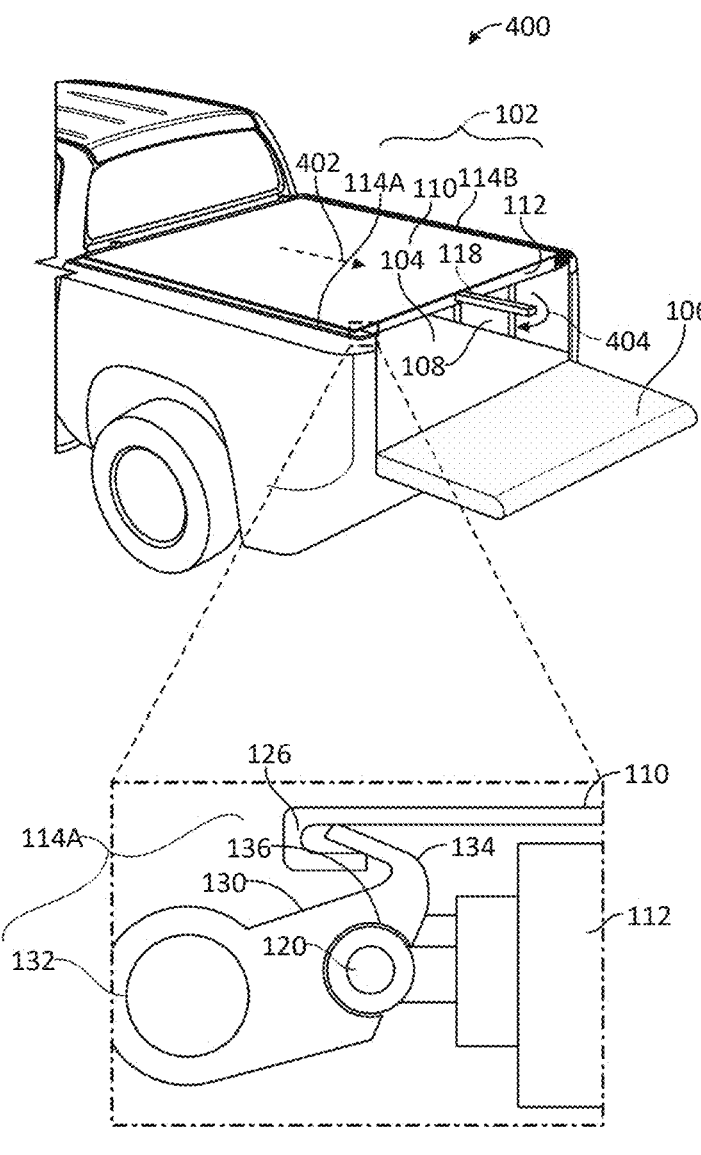
FIG. 4 illustrates a vehicle with a tonneau system in an extended configuration, in accordance with an embodiment.

FIG. 4 depicts tonneau system 102 in extended configuration 400. In the enlarged sub-image, FIG. 4 depicts an exemplary embodiment of a rail attached to a cover. In the embodiment of FIG. 4, rail 114A includes a cam 130, a rotational axis 132 of cam 130, a tooth 134 on the cam 130 and spaced from rotational axis 132, and a cavity 136 in cam 130. Cavity 136 and tooth 134 of rail 114A are configured to correspond and couple with protrusion 120 of beam 112 and lip 126 of cover 110 respectively. As tonneau system 102 is moved from the retracted configuration to the extended configuration, protrusion 120 moves along cavity 136 and lip 126 moves along tooth 134. In this way, cover 110 is supported by rail 114A (and corresponding interactions at rail 114B) by both the interaction of protrusion 120 with rail 114A and the interaction of lip 126 with rail 114A. Further, this interaction may advantageously assist in positioning the cover 110 as it transitions between the retracted and extended configurations. In some other embodiments, a tooth is positioned toward the rail's tail end only, thereby saving material and reducing obstructions for the rail as the cover transitions between the retracted to extended configurations.

In extended configuration 400, cover 110 fully overlaps the open cargo volume of the vehicle. In this configuration, pulling on rod 118 may tension cover 110 in direction 402. As used herein, tensioning a cover may be understood to include providing tension to the cover or stretching the cover so as to make the cover more taut. Thus, when cover 110 is tensioned in the direction 402, the cover is stretched in that direction and sag, if present, can be reduced. In some embodiments, direction 402 is parallel to the side edges of cover 110.

Figure 5:
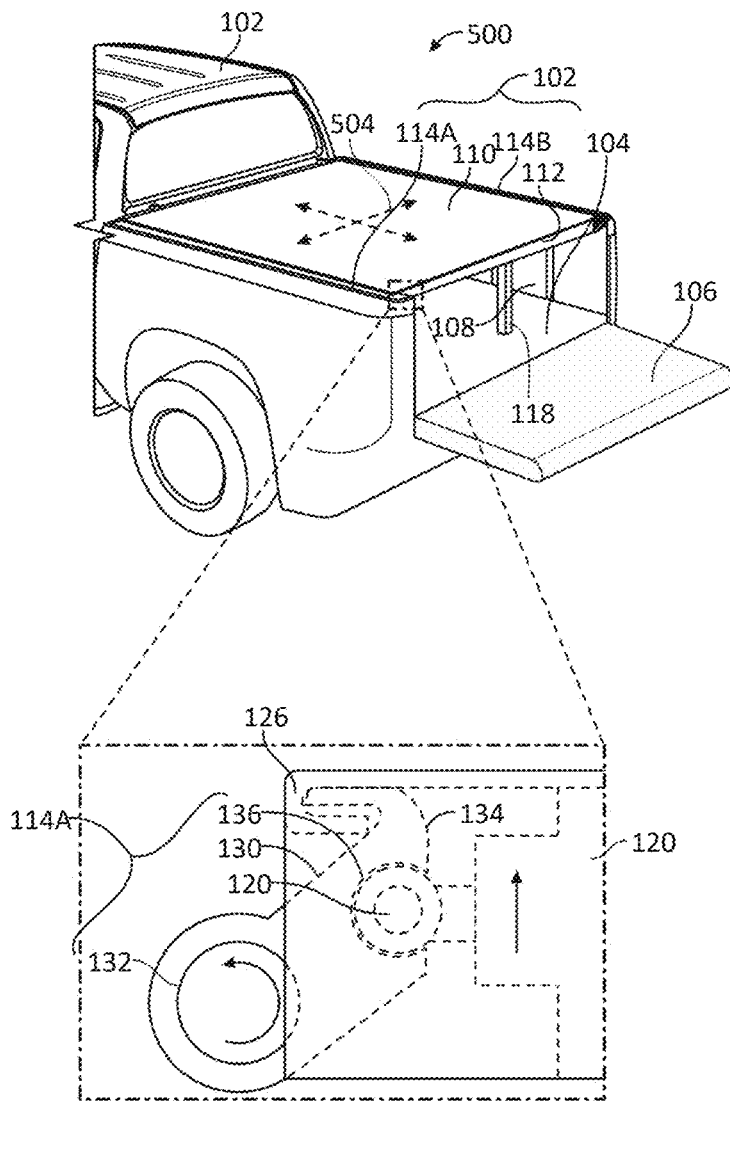
FIG. 5 illustrates a vehicle with a tonneau system in an extended configuration, in accordance with an embodiment.
Figures 6, 7:
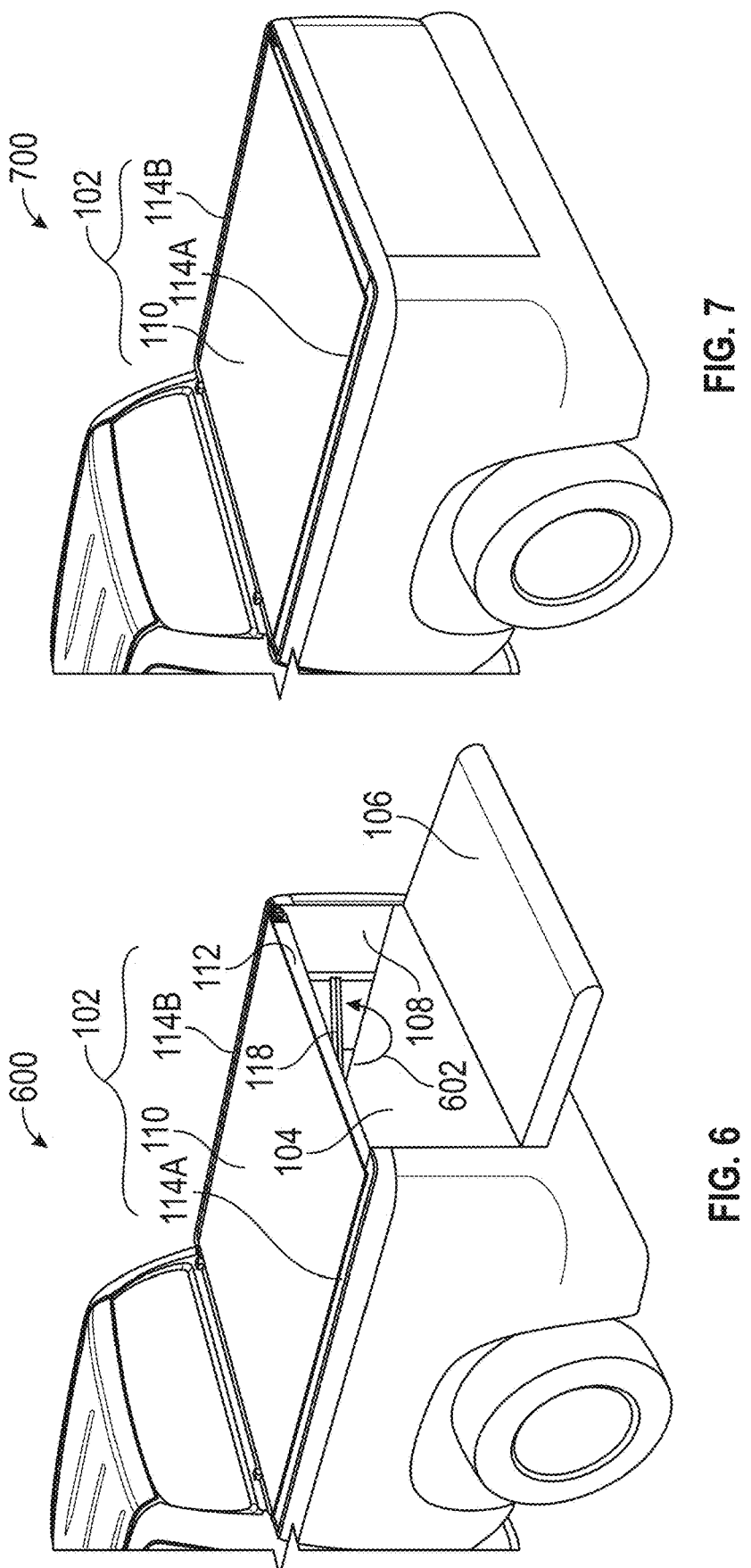
FIG. 6 illustrates a vehicle with a tonneau system in an extended configuration, in accordance with an embodiment.
FIG. 7 illustrates a vehicle with a tonneau system in an extended configuration, in accordance with an embodiment.

The next step may include rotating rod 118 in the direction 404. As shown in FIG. 5, rotating rod 118 in direction 404 further tensions the cover 110 in the direction 402. Simultaneously, cover 110 is also tensioned in a direction transverse to direction 402. Thus, rotation of beam 112 bi-directionally tensions the cover 110, as depicted by double arrow 502.

An exemplary mechanism for side-to-side tensioning of cover 110 is shown in the enlarged sub-image of FIG. 5. As beam 112 is rotated toward its position shown in FIG. 5, it causes protrusion 120 to move up, thereby causing rail 114A to rotate about its axis 132. (In the embodiment of FIG. 5, the beam is shown rotated by approximately 90 degrees; this angle is exemplary and other angles may be employed to meet desired criteria, such as ease of use, force required to tension the cover, and fit of other components such as rods within the assembly or cargo volume when beam is in rotated position, and by choosing dimensions/geometry of the components.) This rotation in turn forces the tooth 134 of rail 114A to push laterally on lip 126. At the same time, a corresponding tooth of rail 114B pushes laterally, and in the opposite direction of lip 126, on a corresponding lip. By laterally pushing on both sides of cover 110, the cover is tensioned in the side-to-side direction (e.g., a direction perpendicular to the side edges of cover 110). Further, in this embodiment, rails 114A and 114B extend fore and aft (e.g., from the cab to the tail gate in the vehicle depicted in FIGS.

4 and 5) and thus the side-to-side tension of cover 110 extends from fore to aft over the cargo volume. Although FIGS. 4 and 5 illustrate a fixed rotational axis 132, it will be appreciated that other embodiments may include a moveable axis to facilitate sealing.

As shown in FIGS. 4 and 5, some embodiments of bi-directionally tensioning a cover include first tensioning the cover in a direction parallel to the side edges and then simultaneously further tensioning the cover in the direction parallel to the side edges and in the direction parallel to the tail edge. In some embodiments, the cover is tensioned 30% in the first direction before being tensioned in both directions. Although FIGS. 4 and 5 illustrate a particular embodiment for bi-directionally tensioning the cover, other embodiments (for example, the embodiments described below with respect to FIGS. 8A-12) may employ different mechanisms for bi-directionally tensioning the cover.

In addition to allowing for cover 110's tensioning in the side-to-side direction, lip 126's interaction with tooth 134 may also hold cover 110 in position over the cargo area when the tonneau system is in the extended configuration. For example, the cover 110 may prevent wind from getting between the cover and the cargo volume's side walls, which could otherwise cause a cover to lift from the cargo volume and, with sustained force, tear or otherwise damage the cover and/or tonneau system. In some embodiments, sealing is accomplished between the cover and side wall directly or, optionally, using an additional sealing element (e.g., gasket) that is attached to the cover, the side wall, or both. Exemplary seals include, but are not limited to, any suitable material, including rubber (e.g., EPDM rubber)

In some embodiments, lip 126 is the same material and thickness as cover 110. In some embodiments, lip 126 includes different material, thickness, and/or flexibility. For example, lip 126 may be reinforced to withstand increased forces applied by the tooth 134 during bi-tensioning of the cover in the side-to-side direction. Such reinforcement may decrease the flexibility of lip 126 relative to the remainder of cover 110. In some further embodiments, the lip 126 is sufficiently flexible to fold when the cover 110 is rolled or other compressed. Exemplary materials of lip 126 include, but are not limited to vinyl, canvas, polyester fabric, Kevlar®, other weather-resistant fabric, or any combination thereof.

Cover 110 may, in some embodiments, be level with the top of the side walls of the cargo volume. In this way, water (e.g., rain) may run off the side of the cover and over the side walls of the cargo volume. Further, this configuration may provide a pleasing aesthetic.

In some embodiments, beam 112 may be configured to receive rod 118. For example, in the configuration shown in FIG. 6, rod 118 is rotated in direction 602 and fits within beam 112. In this way, rod 118 can be stowed when not in use. Moving to FIG. 7, tail gate 106 is closed, enclosing rod 118, beam 112, and rails 114A inside the cargo volume. This configuration may provide enhanced security by limiting the ability to move the tonneau system 102 from the extended configuration to the retracted configuration. For example, where tail gate 106 is fitted with a lock, access to the rod 118 is limited by access through the tail gate lock.

Although FIGS. 1A-7 depict a manual operation of the tonneau system, some embodiments include a motor to move the system between the extended configuration and the retracted configuration. In such embodiments, the motor is configured to close the tonneau system (e.g., move from a retracted configuration to an extended configuration) and open the tonneau system (e.g., move from an extended configuration to a retracted configuration). In some embodiments, the motor causes a beam and rails to bi-directionally tension the cover. In a motorized embodiment, the tonneau system can be coupled to a user interface to control the position of the cover.

Figures 8A, 8B:
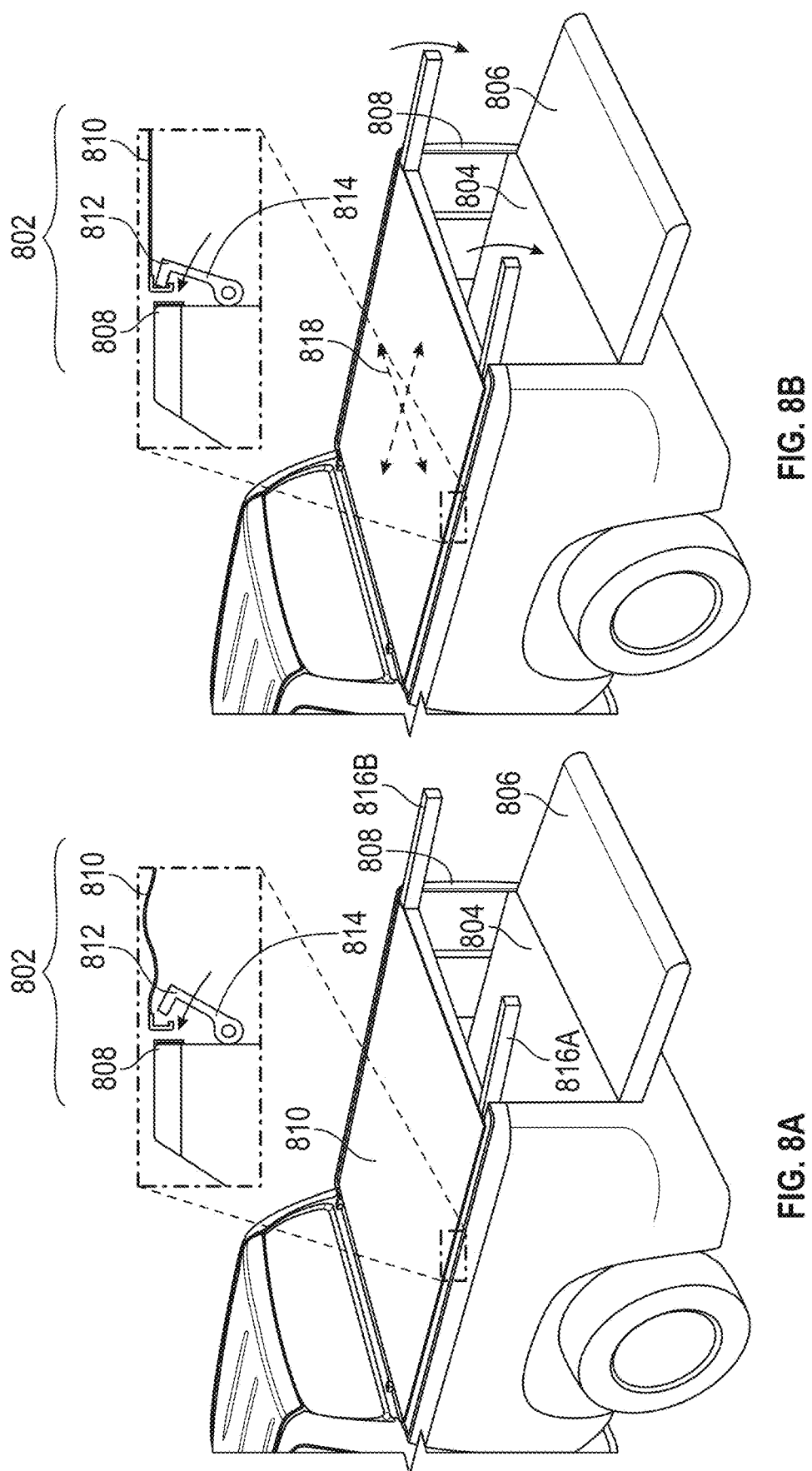
FIGS. 8A and 8B illustrate a vehicle with a tonneau system in an extended configuration, in accordance with an embodiment.

FIGS. 8A and 8B illustrate another example of tensioning a cover of a tonneau system. FIG. 8A illustrates a vehicle with a cargo volume bounded by the vehicle's cab, truck bed 804, tail gate 806, and side walls 808. The vehicle is equipped with a tonneau system 802 that includes cover 810, a rail 812 that rotates about an axis 814, and rods 816A and 816B. FIGS. 8A and 8B illustrate tonneau system 802 in an extended configuration. In FIG. 8A, rail 812 is rotated about axis 814 to pull cover 810 against sidewall 808, thereby tensioning the cover and removing sag, if present. Thereafter, rods 816A and 816B are rotated downwards to tension the cover 110 in two directions, as illustrated by the bi-directional arrow 818.

Figure 9A:
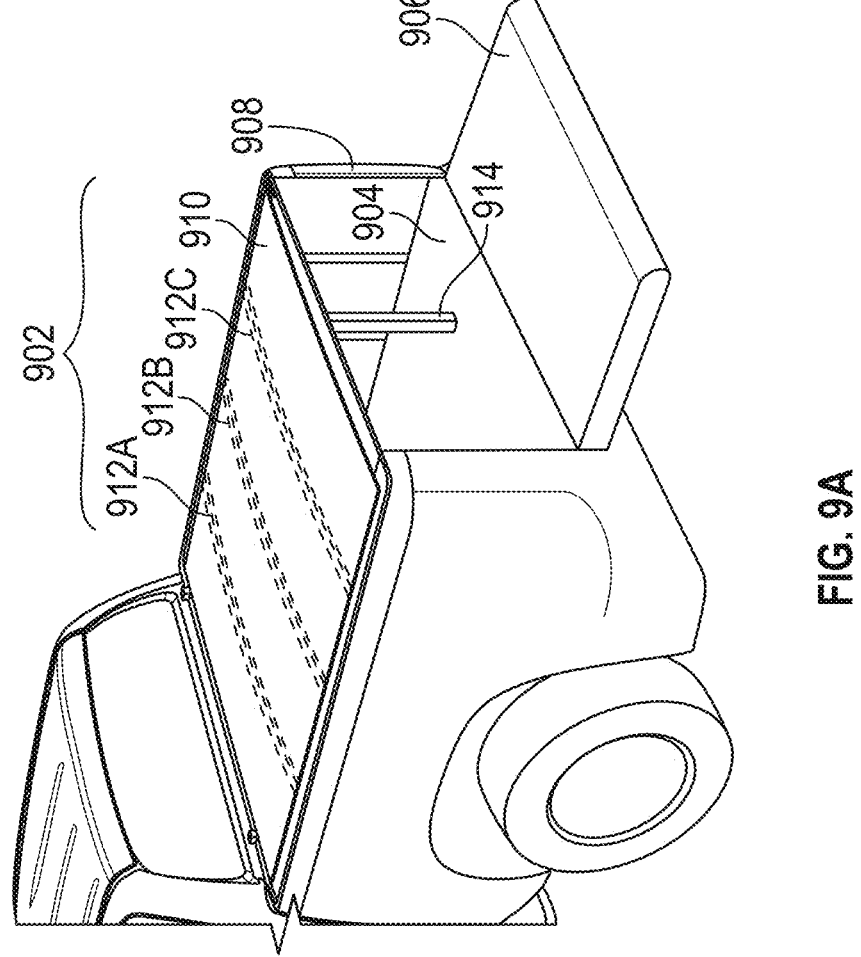
FIGS. 9A-9C illustrate a vehicle with a tonneau system in an extended configuration, in accordance with an embodiment.
Figure 9B:
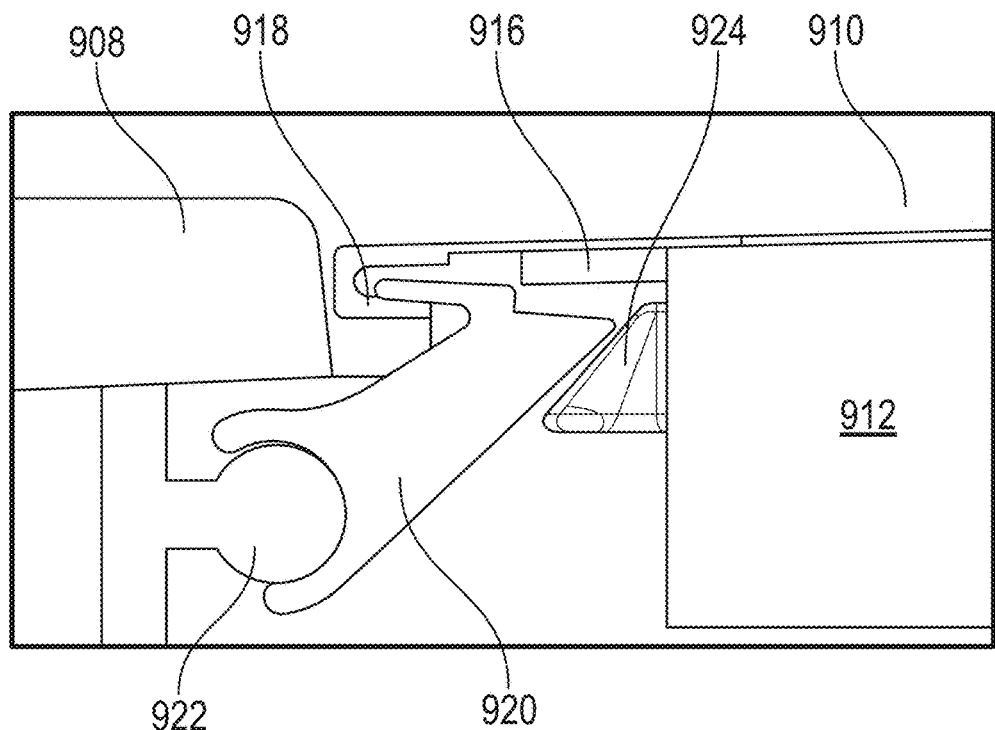
Figure 9C:
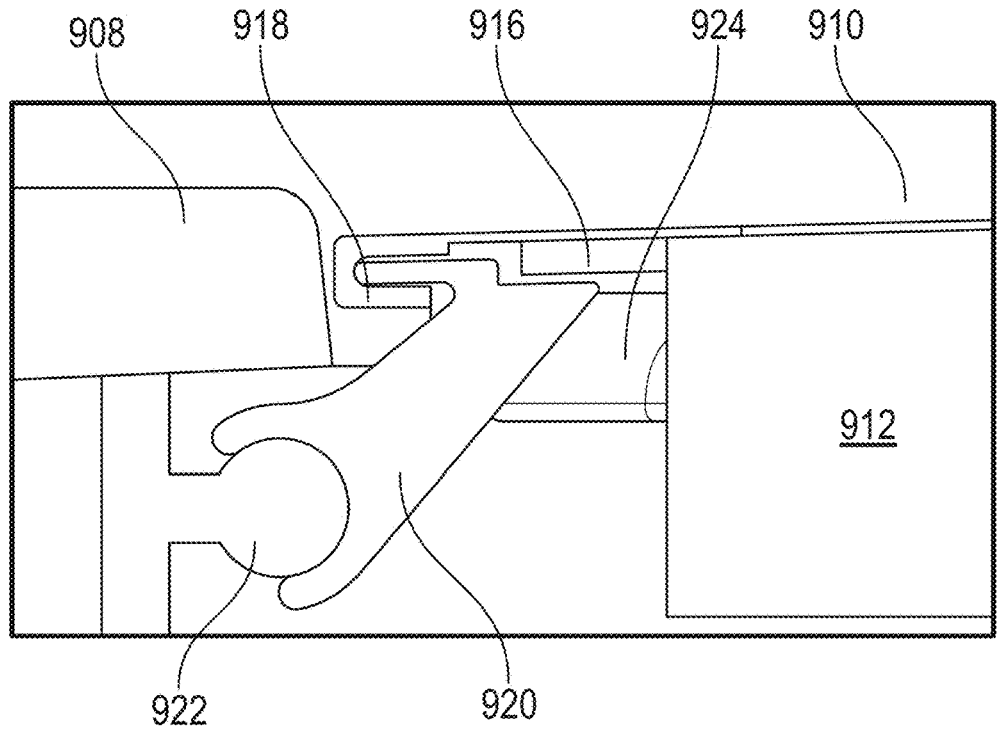

FIGS. 9A-9C illustrate another example of tensioning a cover of a tonneau system. FIG. 9A illustrates a vehicle with a cargo volume bounded by the vehicle's cab, truck bed 904, tail gate 906, and side walls 908. The vehicle is equipped with a tonneau system 902 that includes cover 910, ribs 912A-912C, and rod 914.

FIG. 9A illustrate tonneau system 902 in an extended configuration. Tonneau system 902 may be moved from a retracted configuration to the extended configuration using rod 914, for example, in the same way as tonneau system 102 is moved from a retracted configuration to an extended configuration using rod 118. Ribs 912A, 912B, and 912C are positioned under the cover and in a direction parallel to the tail edge. The ribs provide additional support for the cover and, in some embodiments, may be arced to promote water runoff (e.g., rain) away from the cargo volume. Sealing of the cargo volume along the side walls may further enhance the benefit of an arced cover.

Turning to FIGS. 9B and 9C, tonneau system 902 bi-directionally tensions cover 910 when beam 912 is rotated, similar to rotation of beam 112 in FIGS. 1A-7. Rotation of beam 912 causes element 924 to extend and move upwards. This movement of element 924 in turn causes rail 920 to rotate about axis 922, thereby pushing a tooth of rail 920 into lip 918 of cover 910. This force on the lip 918 tensions the cover 910 by forcing the lip toward truck bed 908. System 902 also includes element 916 which assists in securely seating rail 920 into lip 918.

Figure 10A:
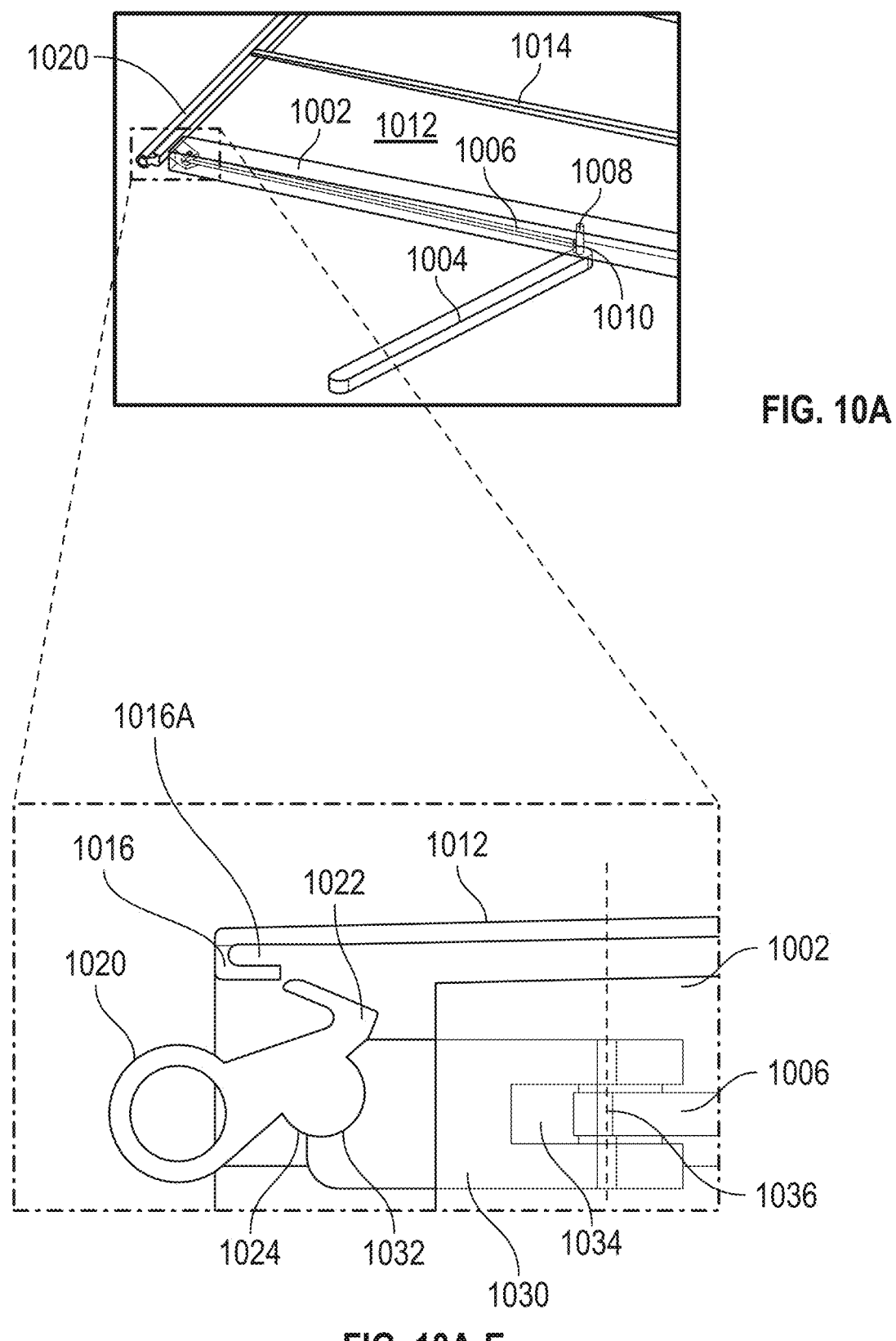
FIGS. 10A-10C illustrate a tonneau system in an extended configuration, in accordance with an embodiment.
Figure 10B:
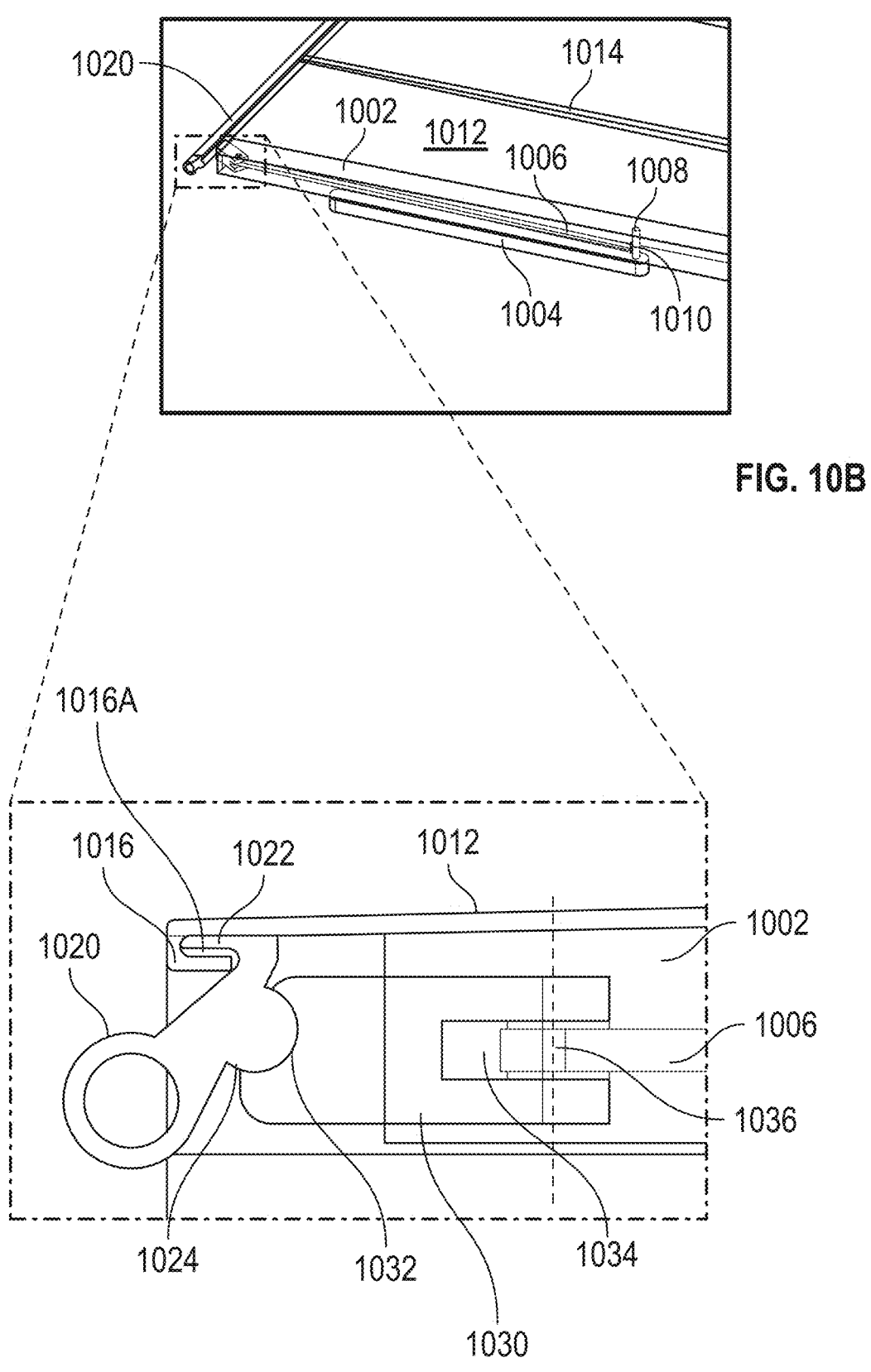
Figure 10C:
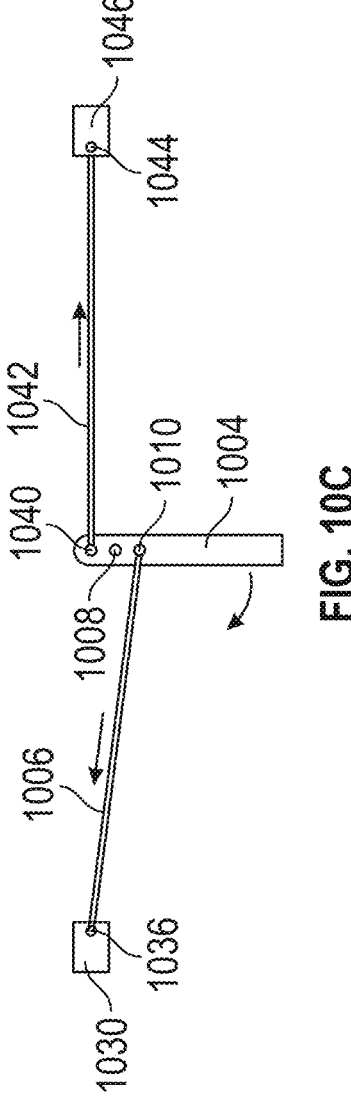

FIGS. 10A-10C illustrate another exemplary tonneau system 1000. FIGS. 10A and 10B illustrate tonneau system 1000 in an extended configuration. Tonneau system 1000 may also include a retracted configuration (not shown). Tonneau system 1000 includes cover 1012, a rail 1020 coupled to a side edge of cover 1012, and a beam 1002 coupled to a tail edge of cover 1012. Beam 1002 and rail 1020 cooperate to tension cover 1012 in a direction parallel to the side edge of the cover. Rib 1014 provides additional support for the cover and, in some embodiments, may be arced to promote water runoff (e.g., rain) away from the cargo volume. Tonneau system 1000 may be combined with other tonneau systems described herein, including, for example and without limitation, the tonneau systems described above with respect to FIGS. 1A-9C.

As described with respective to other embodiments, rod 1004 pulls cover 1012 in a direction parallel to the side edges of the cargo volume to move the cover from a retracted configuration to an extended configuration and tensions cover 1012 in a direction parallel to the cover's side edges. Between FIGS. 10A and 10B, rod 1004 is rotated relative to beam 1002 to tension cover 1012 in a direction parallel to cover's tail edge. In some embodiments, rotating rod 1004 relative to beam 1002 causes bi-directional tensioning of cover 1012.

The embodiment of tonneau system 1000 provides an exemplary system for pivoting a rail using a rod connected to a beam. In the embodiment of FIGS. 10A-10C, linking element 1006 is connected to rod 1004 such that rotating rod 1004 relative to beam 1002 causes linking element 1006 to move toward rail 1020. Moving linking element 1006 toward rail 1020 causes rail 1020 to rotate toward the side wall of the cargo volume, as shown in the enlarged view 10A-E and 10B-E associated with FIGS. 10A and 10B, respectively. As described with respect to other embodiments herein, rotating rail 1020 causes cover 1012 to tension in a direction parallel to the tail edge of the cover.

Enlarged views FIGS. 10A-E and 10B-E depict additional detail on the exemplary tonneau system of FIGS. 10A and 10B. Rail 1020 includes tooth 1022. As rail 1020 is rotated, tooth 1022 is pushed laterally on lip 1016 of cover 1012 (see position change of rail 1020 between FIGS. 10A and 10B) thereby pushing a side edge of cover 1012 against a sidewall of the cargo volume. At the same time, a corresponding tooth of a rail on the other side of cover may push laterally, and in the opposite direction of lip 1016, on a corresponding lip at the other side of the cover. By laterally pushing on both sides of cover 1012, the cover is tensioned in the side-to-side direction (e.g., a direction perpendicular to the side edges of cover 1012). In some examples, tooth 1022 may interface with lip 1016 at a corresponding recess 1016A of lip 1016. Enlarged views FIGS. 10A-E and 10B-E also include an exemplary system for rotating rail 1020. For example, when rod 1004 is rotated, linking element 1006 is moved outward (e.g., toward the side wall of a cargo volume) and moved upward. Block 1030 contains recess 1034 for receiving linking element 1006 and linking element 1006 is rotatably attached to block 1030 at axis 1036. When linking element 1006 is moved out and up, rail 1020 is rotated through an interaction between a protrusion 1024 of rail 1020 and a recess 1032 of block 1030.

In the embodiments of FIGS. 10A and 10B, rod 1004 is coupled to beam 1002 at axis 1008 and rod 1004 is coupled to linking element 1006 at axis 1010. FIG. 10C provides aspects of a tonneau system that includes two linking elements connected to a rod. Second linking element 1042 is coupled to rod 1004 at connection point 1040 and to block 1046 at connection point 1044. In the same way as linking element 1006, rotating rod 1004 relative to beam 1002 causes the second linking element 1042 to move toward a second rail and tension the cover. In some embodiments, the rod 1004 and beam 1002 couple at a point 1008 between an axis 1010 where the rod 1004 and first linking element 1006 couple and a point 1040 where the rod 1004 and second linking element 1042 couple.

FIGS. 11A-11D illustrate exemplary features of tonneau systems in accordance with various embodiments. The embodiments of FIGS. 11A-11D can be combined with other embodiments described herein, such as the tonneau systems described above with respect to FIGS. 1A-10C.

Figure 11A:
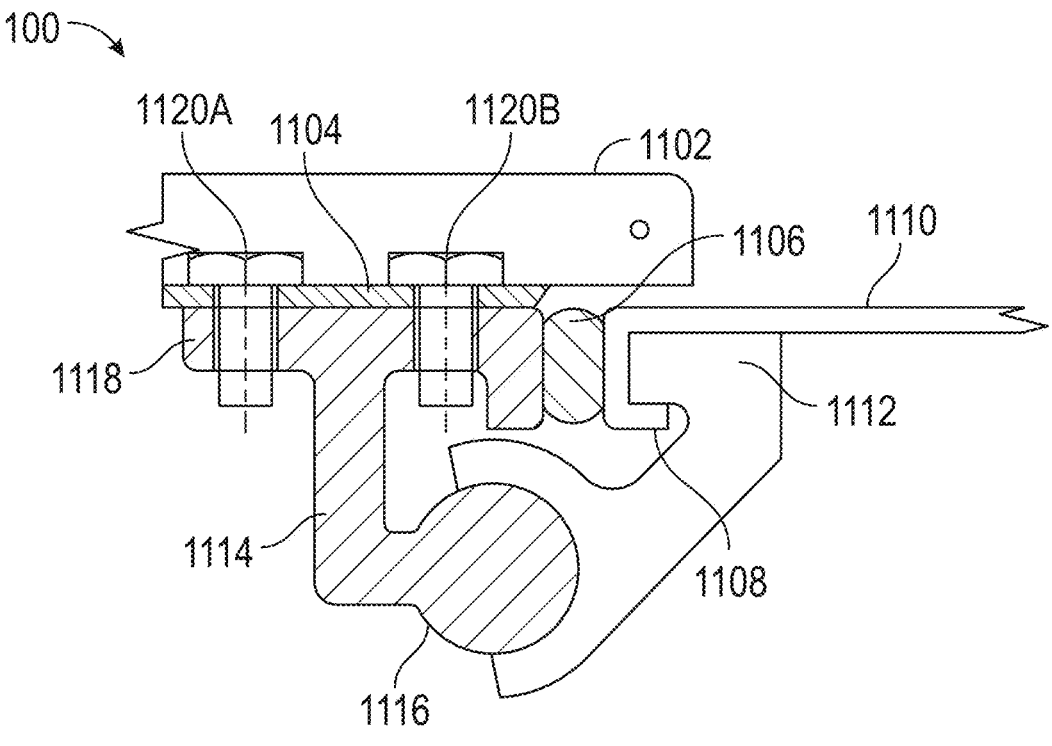
FIGS. 11A-11D illustrate features of embodiments of tonneau systems.

FIG. 11A illustrates tonneau system 1000 including cover 1110 and rail 1112. To tension cover 1110, rail 1112 is rotated against lip 1108, similarly to other lip-rail interactions disclosed herein. Rotation of rail 1112 also cause compression of gasket 1106. Rail 1112 rotates about ball 1116 of rail support 1114. Rail support 1114 includes a flange 1118 that attached to vehicle frame 1104 using two bolts 1120A and 1120B. Vehicle trim 1102 is attached to vehicle frame 1104.

Features of tonneau system 1100 may increase water proofing of a tonneau system. For example, gasket 1106 is positioned between the cover 1110 and a side wall of a cargo volume. Gasket 1106 may further improve the seal between the cover and cargo volume side wall. In some embodiments, positioning a gasket between a cover and a side wall includes contacting the gasket against the side wall and against the cover. In some embodiments, positioning a gasket between a cover and a side wall includes contacting the gasket with the cover and with a rail support, such as rail support 1114 illustrated in FIG. 11A. In some embodiments, a trim 1102 of a cargo volume (for example, a trim of a truck bed) overhangs the point where the cover and cargo volume (or rail support) interact, thereby limiting water directly falling through the sealing point (with or without a gasket) between the cover and the cargo volume.

Figure 11B:
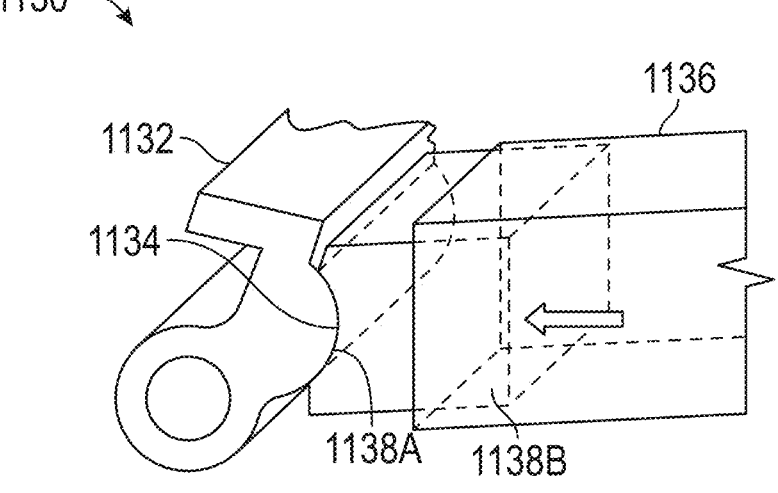
Figures 11C, 11D:
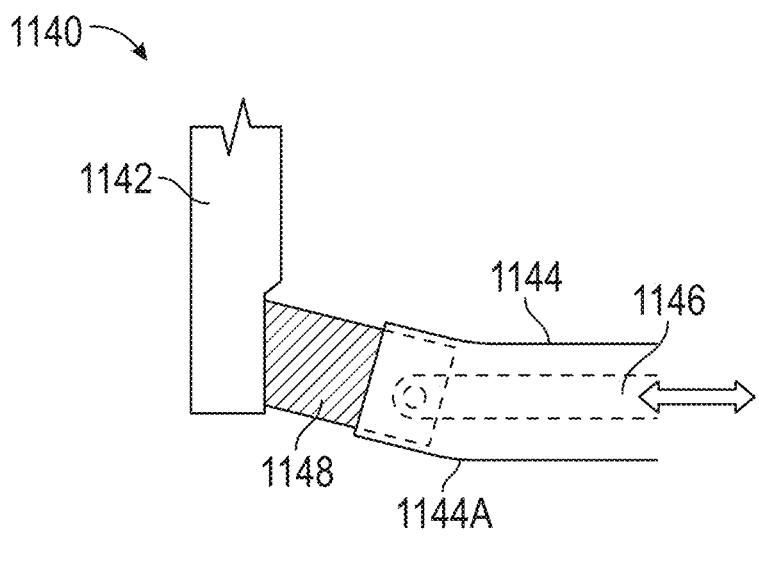

FIGS. 11B-D illustrate additional systems for rotating a rail. For example, FIG. 11B illustrates tonneau system 1130 which includes a beam 1136 and a rail 1132. Within beam 1136, a plunger 1138B may include a recess 1138A which contacts a protrusion 1134 on rail 1132. The plunger 1138B may be compressible such that when the beam 1136 is moved toward the rail 1132, the plunger 1138B rotates the rail 1132 while also deforming to correspond to a different contact point on the protrusion 1134. In some embodiments, the plunger 1138B is nylon. In some embodiments, plunger 1138B is configured to allow the tonneau system 1130 to move (i.e., allow beam 1136 to move) to and from an extended to retracted state when plunger 1138B is in an uncompressed state, and further configured to fully or partially prevent the tonneau system 1130 from moving (i.e., prevent beam 1136 from moving) when plunger 1138B is in a compressed state. For example, when in an uncompressed state, plunger 1138B may slide along, or adjacent to, rail 1132 when tonneau system 1130 is being moved to and from an extended and retracted state. In some embodiments, recess 1138A is configured to, when plunger 1138B is in an uncompressed state, guide beam 1136 along the rail 1132. For example, recess 1138A may be in constant or periodic contact with protrusion 1134 as beam 1136 is moved to and from a retracted and extended configuration so as to prevent the beam from moving substantially in the vertical and lateral directions.

Tonneau systems 1140 and 1150 of FIGS. 11C and 11D include plungers 1148 and 1156, respectively, which operates in a similar manner as plunger 1138B described above. Beams 1144 and 1154 push against plungers 1148 and 1156 to rotate rails 1142 and 1152, respectively. In the embodiments of tonneau systems 1140 and 1150, the respective beams are angled (e.g., comprise angled portions 1144A and 1154A on the beams proximal the corresponding rail) such that when the beam is pushed toward the rail, the beam applies an upward force on the rail to encourage rail rotation. In such examples, the angles of angled portions 1144A and 1154A (e.g., the angle between a plane of a middle portion of a respective beam 1144 or 1154 and a plane of an angled portion 1144A and 1154A, respectively) may be chosen to meet desired criteria, such as ease of use, force required to encourage rail rotation, and fit of other components such as rods within the assembly or cargo volume. Tonneau system 1140 also includes a bar 1146 inside beam 1144, which may operate in a similar manner as linking elements 1006 and 1042 described above with respect to tonneau system 1000.

Figure 12:
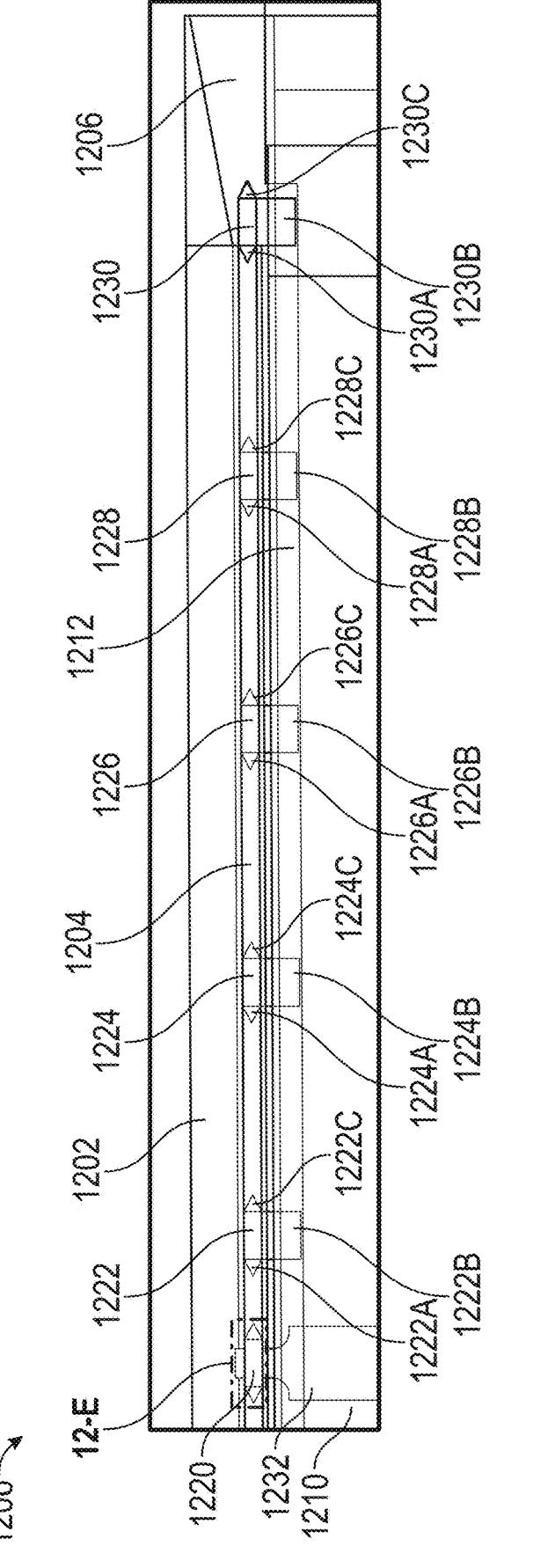
FIGS. 12 and 12-E illustrates a tonneau system, in accordance with an embodiment.

FIG. 12 illustrate an exemplary tonneau system 1200. FIG. 12 is a top down view of the tonneau system 1200, for example a perspective view from above a cargo volume (in FIG. 12, the cargo volume is a truck bed for illustrative purposes). Tonneau system 1200 includes a cover 1210 and a cargo volume side edge 1202. When tonneau system 1200 moves from a retracted configuration to an extended configuration, cover 1210 moves right to left, as depicted in FIG. 12, and parallel to cargo volume side edge 1202. When tonneau system 1200 moves from an extended configuration to a retracted configuration, cover 1210 moves left to right, as depicted in FIG. 12, and collects (e.g., the cover is rolled to save space) at the right end. Cover 1210 may collect inside the cargo volume or inside a frame of the vehicle and adjacent the cargo volume.

In some embodiments, the system includes slugs attached to the cover and configured to sit in the track. FIG. 12 illustrates exemplary slugs 1220, 1222, 1224, 1226, 1228, and 1230. At one end of the tonneau system 1200, a guide ramp 1206 assists slugs 1220, 1222, 1224, 1226, 1228, and 1230 to sit in track 1204, as described further below. Guide ramp 1206 sits at one end of the cargo volume, for example adjacent a cab of a truck when the cargo volume is a truck bed (in such an embodiment, the truck cab is to the right of tonneau system depicted in FIG. 12). The opposite end of the cargo volume (for example, the tail gate of a truck when the cargo volume is a truck bed) includes the tail edge of the cover when the tonneau system is in the extended configuration. FIG. 12 illustrates one side of the cargo volume edge and corresponding cover with slugs in a track, but it should be understood that the opposite side of the cargo volume edge may also include another track with corresponding slugs.

Tonneau system 1200 includes track 1204 which, in some embodiments, may be a portion of a rail disclosed herein. Track 1204 may be attached directly or indirectly to side edge 1202 of the cargo volume. Cover 1210 comprises slugs 1220, 1222, 1224, 1226, 1228, and 1230 attached to cover 1210 along cover edge 1212. Cover edge 1212 may be reinforced to couple to the slug flanges 1222B, 1224B, 1226B, 1228B, and 1230B (slug 1220 comprises a rib, which is discussed further below). The slugs are fed into track 1204 and thereby tension cover 1210 in a direction perpendicular to the side-edge 1202 of the cargo volume. The slugs may advantageously allow for more compact storage of the cover in a retraced configuration. By distributing the structure (e.g., slugs) along the side edge of a cover, the cover can be more space-efficient when rolled. The distribution of the slugs along the side edge of the cover may be further aid in compact storage. Although FIG. 12 illustrates the slugs as equally spaced along the side edge, some embodiments may distribute the slugs so that, when the cover is rolled, the slugs overlap less or otherwise stack to increase storage space.

To facilitate smooth transition from a stored configuration of the cover, a guide ramp 1206 may be included to guide the slugs into track 1204. Further, each slug (1222, 1224, 1226, 1228, and 1230) may include angled leading and trailing edges (1222A/C, 1224A/C, 1226A/C, 1228A/C, and 1230A/ C, respectively). Leading edges (1222A, 1224A, 1226A, 1228A, and 1230A) may assist with centering the respective slug into the track. The angled trailing edges (1222C, 1224C, 1226C, 1228C, and 1230C) may assist with unloading the covered into a stored configuration, for example to center the slugs in a spool.

Some embodiments may include a rib that spans the width of a cover, as discussed previously herein. In FIG. 12, for example rib 1232 may span the width of cover 1210. In some embodiments, rib 1232 corresponds to ribs 912A, 912B, 912C, and 1014 described above with respect to FIGS. 9A-10C. In some embodiments, rib 1232 is coupled to slug

1220. When tonneau system 1200 is in the extended configuration, rib 1232 can bow to improve water runoff. In some embodiments, rib 1232 runs parallel to a tail edge of the cover and/or perpendicular to the side edge 1202 of the cargo volume. Although one rib 1232 is discussed with reference to FIG. 12, it will be appreciated that multiple ribs can be used.

Rib 1232 is attached to slug 1220. In some embodiments, rib 1232 extends through slug 1220 and is movable relative to slug 1220. More details of rib 1232 and slug 1220 are shown in the enlarged view FIG. 12-E. FIG. 12-E is a side-view of the region identified as "12-E" in FIG. 12. In view 12-E, the end 1244 of rib 1232 is shown extended through slug 1220. Adjacent the end 1244 and positioned between end 1244 and track 1204 is a feature 1242 that controls the length of the rib across the width of the cargo volume. Track 1204 may include a recess 1204A configured to interface with (e.g., receive) spar 1220A. Feature 1242 may be positioned within recess (e.g., extend inward from the recess toward the center of the vehicle cargo bed). Feature 1242 may be positioned at the point where rib 1232 is configured to bow. Thus, when the cover moves from a retracted configuration toward an extended configuration (e.g., is pulled or mechanically moved), the cover may move freely until it reaches feature 1242. Once the cover is at the position to bow, then feature 1242 increases the lateral distance between the cargo volume side wall and the proximal end 1244 of the rib 1232. Increasing the distance between a cargo volume side wall and the proximal end 1244 exerts a force on the proximal end 1244. This forces causes rib 1232 to bow and thereby tension the cover laterally. In some embodiments, the force is applied to the rib the beam and the rails bi-directionally tension the cover.

Track 1204 may also include opening 1240 that is configured to control the bowing direction of rib 1232. For example, the upper portion of opening 1240 may be larger than the lower portion, thereby providing a path of least resistance for the rib 1232 to bow upwards.

Figure 13:
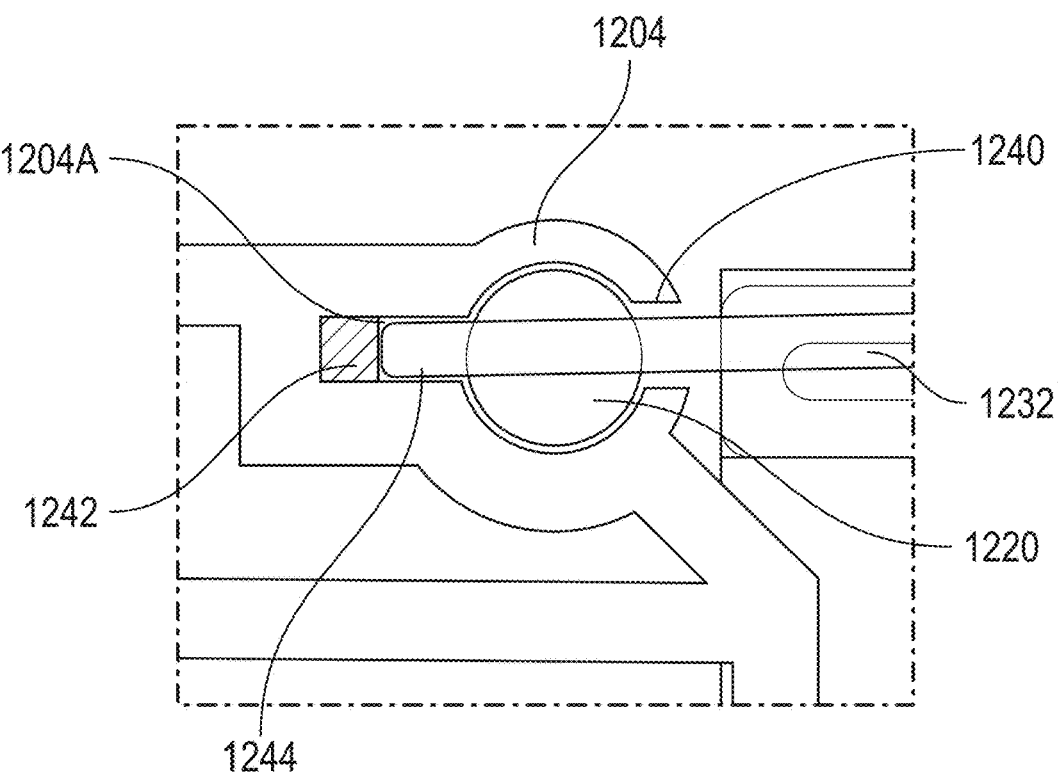
FIG. 13 is a flowchart illustrating steps of a method for closing a tonneau system.

FIG. 13 is a flowchart illustrating steps of a method 1300 for closing a tonneau system. Method 1300 may begin at step 1310 with providing tonneau system. The tonneau system closed in method 1300 may include any of the tonneau systems disclosed herein, such as tonneau system 102, 802, 902, etc. The system may include a cover, a refracted configuration, and an extended configuration. Method 1300 may continue at step 1320, bi-directionally tensioning the cover. The bi-directional tensioning may occur when moving the tonneau system from a retracted configuration to an extended configuration, as discussed elsewhere herein.

In some embodiments of the method, the tonneau system includes a beam and rails, and the cover comprises two side edges and a tail edge, where the beam is coupled to the tail edge of the cover and the rails are coupled to the side edges of the cover. In such embodiments, bi-directionally tensioning the cover may include the beam and the rails cooperating to bi-directionally tension the cover. In some embodiments, the beam and the rails cooperating to bi-directionally tension the cover comprises tensioning the cover in a direction parallel to the side edges and in a direction parallel to the tail edge. In some further embodiments of the method, the beam and rails cooperating to bi-directionally tension the cover comprises first tensioning the cover in the direction parallel to the side edges and then simultaneously tensioning the cover in the direction parallel to the side edges and the direction parallel to the tail edge.

13

In some embodiments of the method, the tonneau system includes a rod coupled to the beam and the method further includes. pulling the rod to move the beam in a direction parallel to the side edges. In further embodiments, rotating the rod relative to the beam causes the rails to tension the cover.

Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for closing a tonneau system including the particular steps of the method of FIG. 13, this disclosure contemplates any suitable method for closing a tonneau system including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Figure 14:
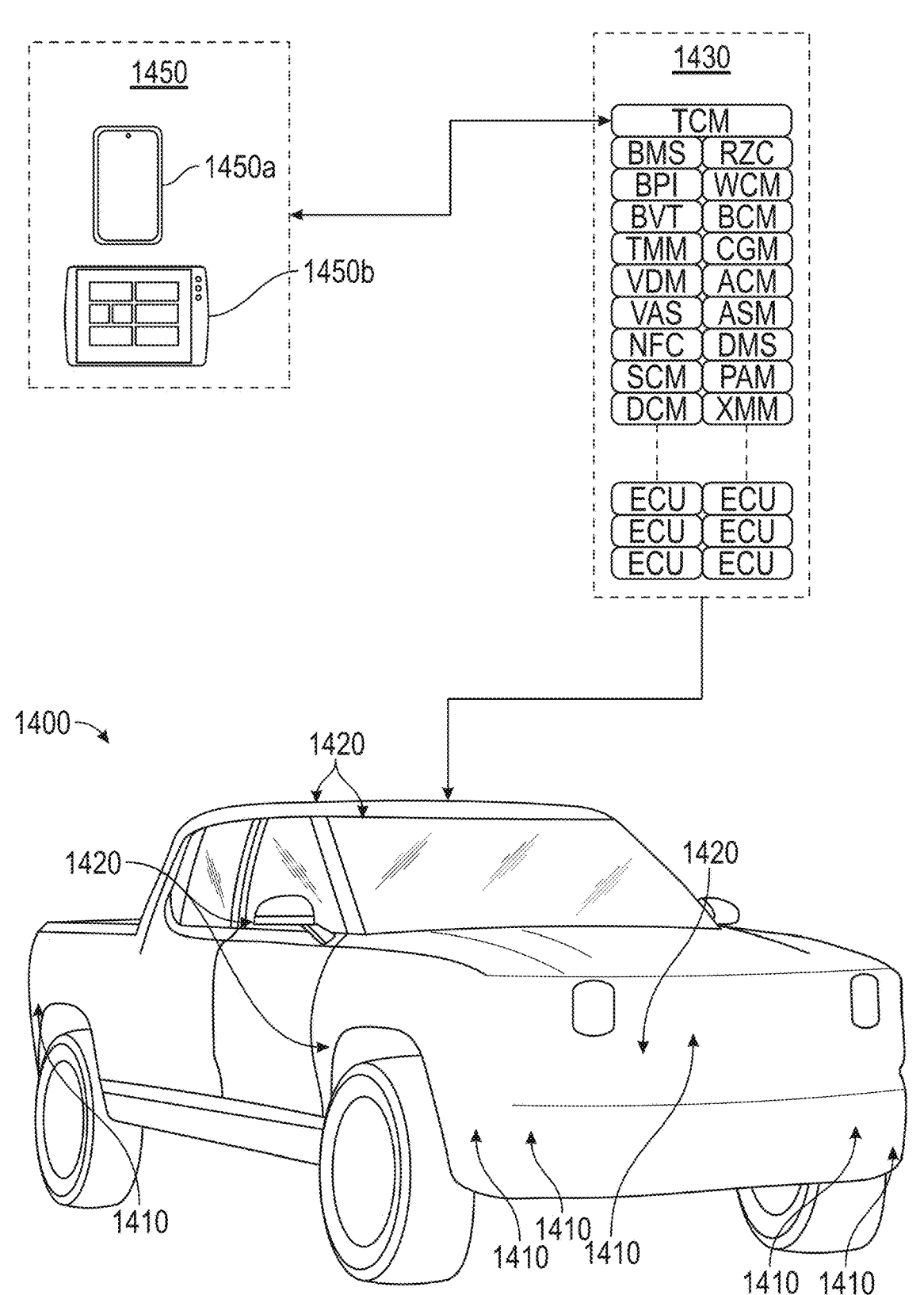
FIG. 14 illustrates an example vehicle.

FIG. 14 illustrates an example vehicle 1400. Vehicle 1400 may include multiple sensors 1410, multiple cameras 1420, and a control system 1430. In some embodiments, vehicle 1400 may be able to pair with a computing device 1450 (e.g., smartphone 1450a, tablet computing device 1450b, or a smart vehicle accessory). As an example and not by way of limitation, a sensor 1410 may be an accelerometer, a gyroscope, a magnometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 1420 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 1400 may include various controllable components (e.g., doors, seats, windows, lights, HVAC, entertainment system, security system), instrument and information displays and/or interactive interfaces, functionality to pair a computing device 1450 with the vehicle (which may enable control of certain vehicle functions using the computing device 1450), and functionality to pair accessories with the vehicle, which may then be controllable through an interactive interface in the vehicle or through a paired computing device 1450.

Control system 1430 may enables control of various systems on-board the vehicle. As shown in FIG. 14, control system 1430 may comprise one or more electronic control units (ECUs), each of which are dedicated to a specific set of functions. Each ECU may be a computer system (as described further in FIG. 15), and each ECU may include functionality provide by one or more of the example ECUs described below.

Features of embodiments as described herein may be controlled by one or more ECUs that provide functionality to control access to the vehicle. A Vehicle Access System (VAS) ECU may provide passive/active wireless sensors (e.g., Bluetooth) authorizing accessing (i.e., locking or unlocking) the vehicle. A Near-Field Communication (NFC) ECU may support an NFC reader embedded in the vehicle (e.g., in the driver-side exterior door handle or in the armrest of the interior, driver-side door panel) for user authentication.

Features of embodiments as described herein may be controlled by a rear ECU. The rear ECU may provide functionality to control different body components, such as, by way of example and not limitation, a license plate lamp, based on vehicle body type. For vehicles with a truck bed, the rear ECU may provide functionality to control a tonneau system, sidebin latch, tailgate latch, sidebin lights, or cargo lamps. For a sport utility-type vehicle with a rear door, the rear ECU may provide functionality to control liftgate latches, a liftgate actuator, puddle lamps, or a rear wiper. For vehicles with a tow hitch, the rear ECU may provide functionality to control trailer braking or a trailer brake stop light. For vehicles with a third row of seats, the rear ECU may provide functionality to control movement of interior components to facilitate easy entry to the rear seats. For a delivery vehicle, the rear ECU may provide functionality to control movement of a bulkhead door motor and latches, rollup door latches, various lamps, rear stop lights, and turn lights.

Features of embodiments as described herein may be controlled by an User Interface (UI) ECU may generate a user interface displayed on a dashboard of the vehicle. The user interface may display information and provide audio output for an infotainment system, including various views around and inside the vehicle. The UI ECU may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by the UI ECU may enable interaction with other modules of control system 1430.

Vehicle 1400 may include one or more additional ECUs, such as, by way of example and not limitation: a Central Gateway Module (CGM) ECU, a Telematics Control Module (TCM) ECU, a Vehicle Dynamics Module (VDM) ECU, a Near-Field Communication (NFC) ECU, a Body Control Module (BCM) ECU, a Seat Control Module (SCM) ECU, a Door Control Module (DCM) ECU, an Autonomy Control Module (ACM) ECU, an Autonomous Safety Module (ASM) ECU, a Driver Monitoring System (DMS) ECU, and/or a Winch Control Module (WCM) ECU. If vehicle 1400 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU.

Figure 15B:
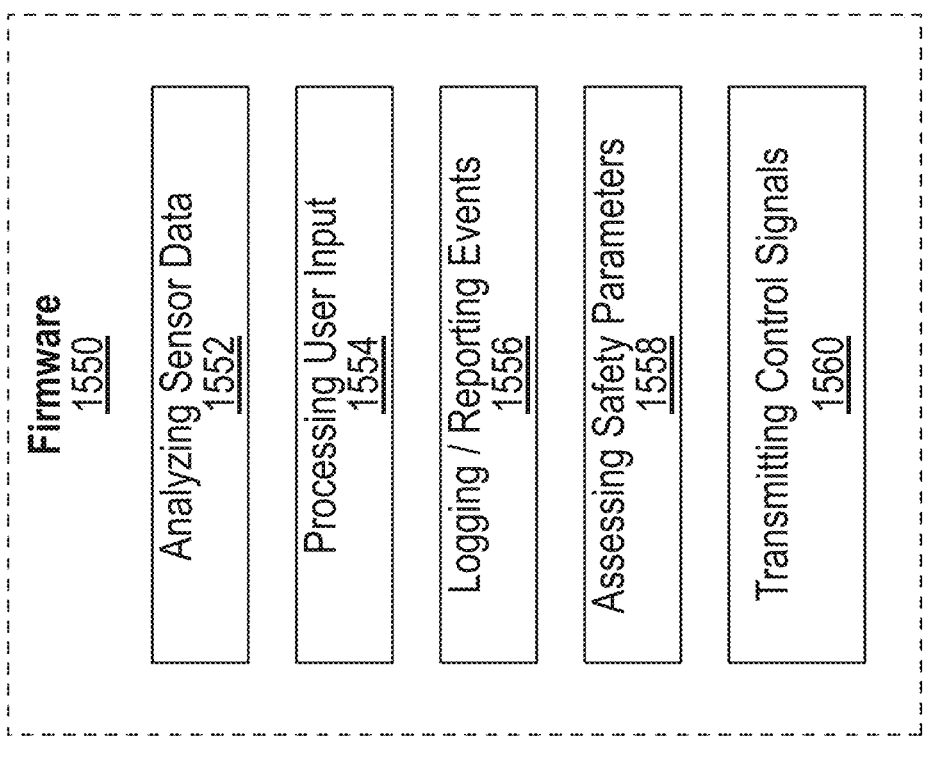
FIG. 15B illustrates example firmware for a vehicle ECU.
Figure 15A:
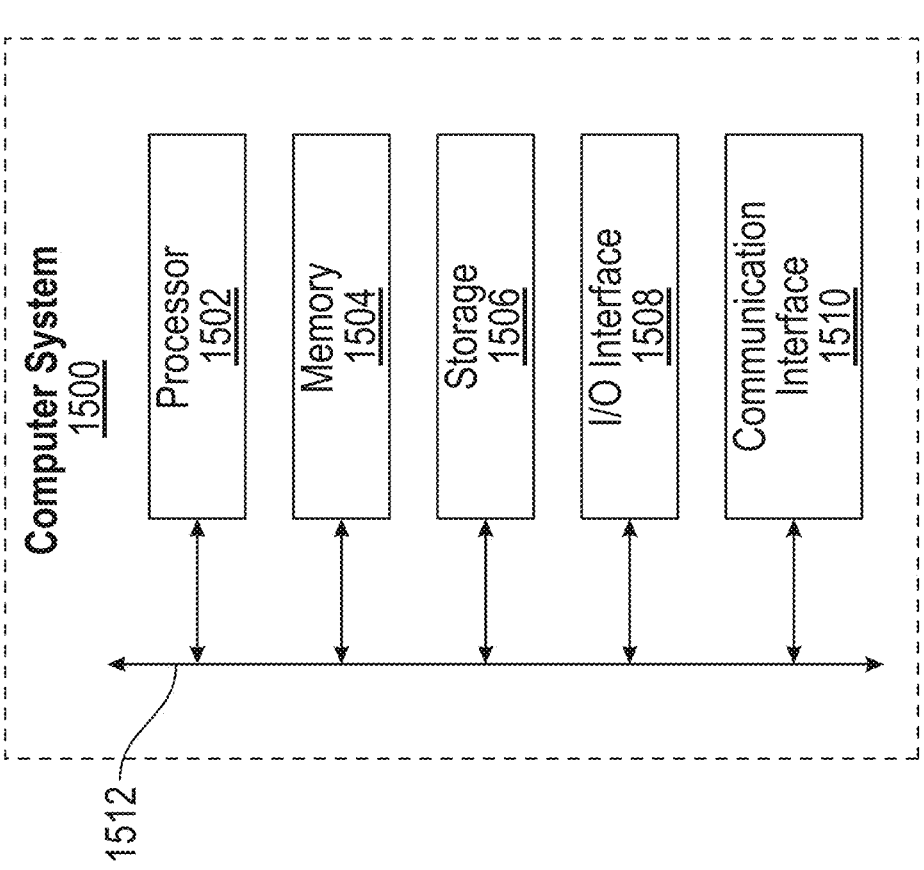
FIG. 15A is a schematic of an example computer system.

FIG. 15A illustrates an example computer system 1500. Computer system 1500 may include a processor 1502, memory 1504, storage 1506, an input/output (I/O) interface 1508, a communication interface 1510, and a bus 1512. Although this disclosure describes one example computer system including specified components in a particular arrangement, this disclosure contemplates any suitable computer system with any suitable number of any suitable components in any suitable arrangement. As an example and not by way of limitation, computer system 1500 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 1500 may include one or more computer systems 1500; be unitary or distributed, span multiple locations, machines, or data centers; or reside in a cloud, which may include one or more cloud components in one or more networks. Where appropriate, computer system(s) 1500 may perform, at different times or at different locations, in real time or in batch mode, one or more steps of one or more methods described or illustrated herein.

Processor 1502 may include hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. Processor 1502 may include one or more internal caches for data, instructions, or addresses.

In particular embodiments, memory 1504 includes main memory for storing instructions for processor 1502 to execute or data for processor 1502 to operate on. In particular embodiments, one or more memory management units (MMUs) reside between processor 1502 and memory 1504 and facilitate accesses to memory 1504 requested by processor 1502. In particular embodiments, memory 1504 includes random access memory (RAM). This disclosure contemplates any suitable RAM.

In particular embodiments, storage 1506 includes mass storage for data or instructions. As an example and not by way of limitation, storage 1506 may include a removable disk drive, flash memory, an optical disc, a magneto-optical disc, magnetic tape, or a Universal Serial Bus (USB) drive or two or more of these. Storage 1506 may include removable or fixed media and may be internal or external to computer system 1500. Storage 1506 may include any suitable form of non-volatile, solid-state memory or read-only memory (ROM).

In particular embodiments, I/O interface 1508 includes hardware, software, or both, providing one or more interfaces for communication between computer system 1500 and one or more input and/or output (I/O) devices. Computer system 1500 may be communicably connected to one or more of these I/O devices, which may be incorporated into, plugged into, paired with, or otherwise communicably connected to vehicle 1400 (e.g., through the TCM ECU). An input device may include any suitable device for converting volitional user input into digital signals that can be processed by computer system 1500, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 1410 described above. An output device may include devices designed to receive digital signals from computer system 1500 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 1508 for them. I/O interface 1508 may include one or more I/O interfaces 1508, where appropriate.

In particular embodiments, communication interface 1510 includes hardware, software, or both providing one or more interfaces for data communication between computer system 1500 and one or more other computer systems 1500 or one or more networks.

Communication interface 1510 may include one or more interfaces to a controller area network (CAN) or to a local interconnect network (LIN). Communication interface 1510 may include one or more of a serial peripheral interface (SPI) or an isolated serial peripheral interface (isoSPI). In some embodiments, communication interface 1510 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 1512 includes hardware, software, or both coupling components of computer system 1500 to each other. Bus 1512 may include any suitable bus, as well as one or more buses 1512, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 15B illustrates example firmware 1550 for a vehicle ECU 1500 as described with respect to control system 1430. Firmware 1550 may include functions 1552 for analyzing sensor data based on signals received from sensors 1410 or cameras 1420 received through communication interface 1510. Firmware 1550 may include functions 1554 for processing user input (e.g., directly provided by a driver of or passenger in vehicle 1400, or provided through a computing device 1450) received through I/O interface 1508. Firmware 1550 may include functions 1556 for logging detected events (which may be stored in storage 1506 or uploaded to the cloud), as well as functions for reporting detected events (e.g., to a driver or passenger of the vehicle through an instrument display or interactive interface of the vehicle, or to a vehicle manufacturer, service provider, or third party through communication interface 1510). Firmware 1550 may include functions 1558 for assessing safety parameters (e.g., monitoring the temperature of a vehicle battery or the distance between vehicle 1400 and nearby vehicles). Firmware 1550 may include functions 1560 for transmitting control signals to components of vehicle 1400, including other vehicle ECUs 1500.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. It should also be understood that as used in the description herein and throughout the claims that follow, the meaning of "a," "an," and "the" includes "one" and "more than one" unless the context clearly dictates otherwise.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A tonneau system for a vehicle, the tonneau system movable between an extended configuration and a retracted configuration, the tonneau system comprising:
a cover comprising two side edges, a lip along one of the side edges, and a tail edge;
a beam coupled to the tail edge of the cover;
a rail coupled to the lip of the cover; and
a mechanism coupled to the rail and configured to move the rail to cause the lip to move outward to tension the cover in a direction parallel to the tail edge when the tonneau system is in the extended configuration.

2. The system of claim 1, wherein the beam and the rail bi-directionally tension the cover by tensioning in a direction parallel to the side edges and in the direction parallel to the tail edge.

3. The system of claim 2, wherein the beam and the rail bi-directionally tension the cover by first tensioning the cover in the direction parallel to the side edges and then simultaneously further tensioning the cover in the direction parallel to the side edges and tensioning the cover in the direction parallel to the tail edge.

4. The system of claim 1, wherein the rail interacts with the lip to tension the cover in the direction parallel to the tail edge.

5. The system of claim 4, wherein the mechanism comprises a cam coupled to the beam such that turning the cam turns the rail, thereby moving the lip away from a center of the cover.

6. The system of claim 1, further comprising a rod coupled to the beam such that pulling the rod moves the beam in a direction parallel to the side edges and wherein rotating the rod relative to the beam causes the rail to tension the cover.

7. The system of claim 6, wherein the rail is a first rail and the lip is a first lip along a first side edge of the two side edges, the system further comprising:
a second lip along a second side edge of the two side edges;
a first linking element connecting the rod to the first rail; and
a second linking element coupled to the rod and connecting the rod to a second rail, wherein rotating the rod relative to the beam causes the first linking element to move toward the first rail to tension the cover and the second linking element to move toward the second rail to tension the cover and wherein the mechanism comprises the first linking element.

8. The system of claim 2, further comprising a rib to support the cover, wherein a force acts on the rib when the beam and the rail bi-directionally tension the cover, the force causing the rib to bow.

9. The system of claim 1, wherein the rail comprises a track, and the system comprises slugs attached to the lip of the cover and configured to sit in the track.

10. The system of claim 1, wherein, in the extended configuration, the cover overlaps an area corresponding to an open cargo volume of the vehicle.

11. The system of claim 1, wherein;
the beam comprises a straight middle portion and angled end portions;
the rail is a first rail and the system further comprises a second rail; and
the end portions are proximal to the first and second rails.

12. The system of claim 11, wherein the mechanism comprises a plunger and the beam is coupled to the plunger at an end portion and the plunger contacts the rail.

13. A method of closing a tonneau system, the system comprising a cover, a rail coupled to a side edge of the cover, and a mechanism coupled to the rail, the method comprising:
moving the tonneau system from a retracted configuration to an extended configuration; and
moving the rail, using the mechanism, to cause the side edge of the cover to move outward to tension the cover in a direction parallel to a tail edge of the cover when in the extended configuration.

14. The method of claim 13, wherein;
the tonneau system comprises a beam;
the beam is coupled to the tail edge of the cover; and
the beam and the rail cooperate to bi-directionally tension the cover.

15. The method of claim 14, wherein the beam and the rail cooperate to bi-directionally tension the cover by tensioning the cover in a direction parallel to the side edge and in a direction parallel to the tail edge.

16. The method of claim 15, wherein the beam and rail cooperate to bi-directionally tension the cover by first tensioning the cover in the direction parallel to the side edge and then simultaneously further tensioning the cover in the direction parallel to the side edge and tensioning the cover in the direction parallel to the tail edge.

17. The method of claim 14, wherein:
the mechanism comprises a rod coupled to the beam;
the method further comprises pulling the rod to move the beam in a direction parallel to the side edges; and
rotating the rod relative to the beam causes the rail to move.

18. A vehicle comprising
a cargo area; and
a tonneau system comprising an extended configuration that overlaps the cargo area and a retracted configuration that overlaps less of the cargo area than the extended configuration, wherein the tonneau system comprises:

a cover comprising two side edges, a lip along one of the side edges, and a tail edge;

a beam coupled to the tail edge of the cover;

a rail coupled to the lip of the cover; and a mechanism coupled to the rail and configured to move the rail to cause the lip to move outward to tension the cover in a direction parallel to the tail edge when the tonneau system is in the extended configuration.

19. The vehicle of claim 18, wherein the vehicle comprises a wall adjacent to the cargo area and wherein the rail is coupled to the wall.

20. The vehicle of claim 18, wherein a trim of the vehicle overhangs a point of interaction between the cover and a side wall of the cargo area.

\* \* \* \* \*